United States Patent [19]
Abens et al.

[11] Patent Number: 4,588,659
[45] Date of Patent: May 13, 1986

[54] FUEL VAPORIZER

[75] Inventors: Sandors G. Abens, Rye, N.Y.;
William Keil, Redding, Conn.

[73] Assignee: Energy Research Corporation, Danbury, Conn.

[21] Appl. No.: 680,309

[22] Filed: Dec. 11, 1984

[51] Int. Cl.⁴ .......................... H01M 8/18; C10J 3/00
[52] U.S. Cl. ........................................ 429/20; 48/61;
48/94; 48/102 R; 48/102 A; 123/3; 123/557;
165/156; 422/211; 429/20
[58] Field of Search ................ 48/61, 94, 105, 102 R,
48/102 A; 422/204, 211; 165/156; 123/3, 557,
560; 122/160; 429/20

[56] References Cited
U.S. PATENT DOCUMENTS

| | | | |
|---|---|---|---|
| 3,522,019 | 7/1970 | Buswell et al. | 420/190 |
| 3,635,682 | 1/1972 | Vine et al. | 23/288 R |
| 4,455,152 | 6/1984 | Hansen | 48/61 |

Primary Examiner—Jay H. Woo
Assistant Examiner—Jennifer E. Cabaniss
Attorney, Agent, or Firm—John J. Torrente

[57] ABSTRACT

A vaporizer for converting liquid fuel into fuel vapor wherein an annular chamber defined by inner and outer walls is provided and wherein rings are situated one after the other along the length of the chamber, each ring extending around the circumference of the chamber in contact with the inner and outer walls and including a passageway for conveying fluid and/or vapor between the liquid/vapor flow spaces situated on opposite sides of the ring.

11 Claims, 6 Drawing Figures

FUEL VAPORIZER

BACKGROUND OF THE INVENTION

This invention relates to fuel vaporizers and, in particular, to fuel vaporizers to be used in fuel conditioners for supplying fuel gas to fuel cell powerplants.

Fuel cell powerplants are similar to conventional electric storage batteries in that, like electric storage batteries, fuel cell powerplants produce electrial current while consuming reacting chemicals at the powerplant electrodes. In storage batteries, the reacting chemicals are included in the battery electrodes themselves, and no transport of reactants to the electrodes is required. In contrast, the electrodes in fuel cell powerplants are inert, and the reactants must be transported to the electrodes from external sources.

Conventional types of fuel cell powerplants generally employ gases as reactants. Air is usually used as the cathode electrode reactant and hydrogen as the anode electrode reactant. The reactant hydrogen is commonly derived by steam reforming a liquid or gaseous hydrocarbon fuel. In this process the hydrocarbon fuel and water are first vaporized and a mixture of the hydrocarbon vapor and water vapor is then passed over a hot catalyst bed. The catalyst bed, in turn, converts the mixture to hydrogen and carbon dioxide for use as the anode electrode reactant. A fuel cell powerplant will thus generally include, in addition to a fuel cell, a fuel conditioner provided with a vaporizer and with a reforming catalyst bed for generating the anode or fuel reactant gas.

A requirement of fuel cell powerplants is that the rate of reactant flowing to the fuel cell electrodes be proportional to the current being drawn from the fuel cell. The reactant flow to the fuel cell is generally higher than the minimum rate predicted by Faraday's Law and, thus, all the reactant is not used in the electrochemical reaction. In the case of the anode or fuel reactant, the excess fuel not used for the electrochemical reaction is routed to a burner. The latter generates heat for the fuel vaporizer and the fuel reformer. For any given operating load both the fuel cell and the burner fuel requirements are fixed, thus fixing the rate of reformed fuel flow which must be delivered to the fuel cell from the fuel vaporizer and fuel reformer.

As can be appreciated, when the operating load of the fuel cell changes, the fuel requirements of the fuel cell and burner also change, thereby necessitating a change in fuel flow to the fuel cell in order to meet these changed requirements. A change in fuel flow to the fuel cell requires that there be a corresponding change in output fuel flow of the fuel vaporizer. While conventional vaporizers such as, for example, standard boilers, operate satisfactorly under constant output flow conditions, such vaporizers do not function adequately where changes in output flow are required. This is especially true where the changes in output flow must be rapid to accomodate rapid load changes, particularly rapid increases in output electric load from low to high values.

The inability of conventional boilers to rapidly vary output flow is caused primarily by the inertia of the boiler which delays production of vapor at the required changed rate. This delay results in the depletion of gaseous fuel at the fuel cell which, in turn, causes a loss of power and, thereby, decreased performance of the cell.

It is therefore an object of the present invention to provide a vaporizer for a fuel cell powerplant which is adapted to provide changes in output flow to accomodate rapid changes in loading of the fuel cell.

SUMMARY OF THE INVENTION

In accordance with the principles of the present invention, the above and other objectives are realized in a fuel vaporizer comprising inner and outer walls which define therebetween an annular chamber and a plurality of rings arranged one after the other along the chamber length, each ring having inner and outer surfaces in contact with the inner and outer chamber walls, respectively, and each ring further having a passage for providing communication between the liquid/vapor flow spaces situated along the chamber length on opposite sides of the ring.

With this type of configuration for the vaporizer, the path for the fuel fed into the vaporizer is confined to the spaces defined by the regions between the rings and the chamber walls (i.e., the liquid/vapor flow spaces). As a result, a fuel path of limited volume but extended surface area is created through the vaporizer. This, in turn, results in an output fuel vapor whose rate of flow can change rapidly in response to rapid changes in the rate of fuel input. The vaporizer can, therefore, accomodate rapid changes in load when employed in a fuel cell powerplant.

In the embodiment of the invention to be disclosed hereinafter, the inner and outer walls of the vaporizer are cylindrical and the rings are of rounded configuration. Furthermore, the passages in successive rings are spaced 180 degrees apart so as to force the flow of liquid through substantially the entire liquid/vapor flow volume defined by the rings and the chamber walls. This ensures maximum contact with the volume surfaces and, therefore, a maximum vaporization effect.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE DRAWINGS

Figure 1:
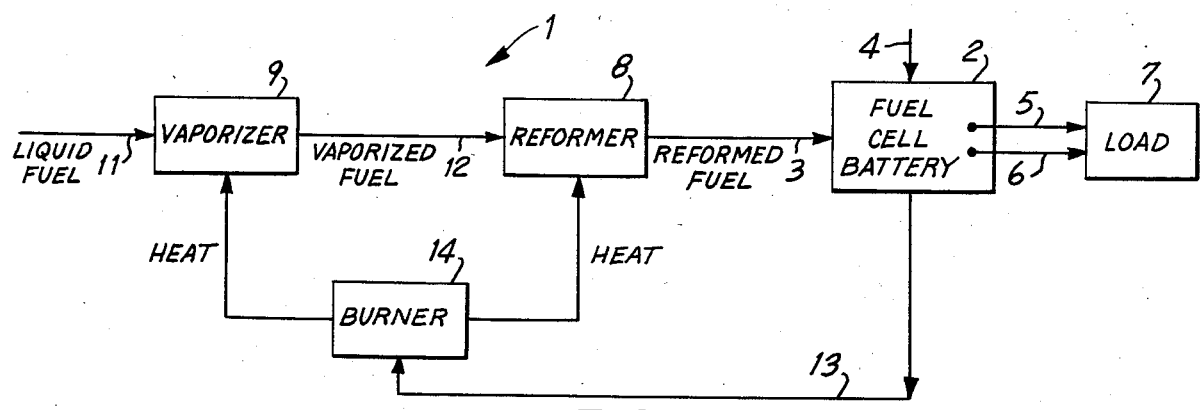
FIG. 1 shows a fuel cell powerplant utilizng a vaporizer in accordance with the principles of the present invention.

In FIG. 1, a fuel cell powerplant 1 comprises a fuel cell 2 having anode and cathode electrode sections 2A and 2B (not visible). The electrode sections 2A and 2B are fed respectively input fuel gas from a fuel gas line 3 and input oxidant gas from an oxidant gas line 4. Electrochemical reaction of these gases in the cell results in the production of electrical current which is fed over lines 5 and 6 to a load 7.

The fuel gas on line 3 is developed by a fuel reformer 8 and a fuel vaporizer 9. In particular, the vaporizer 9 receives hydrocarbon liquid fuel and water from a supply line 11. The vaporizer, in turn, converts the liquid fuel and water to a vaporized or gaseous state and delivers the vaporized mixture to reformer 8 over line 12.

In the reformer, the vaporized fuel and water vapor mixture is passed over a catalyst bed. The catalyst converts the mixture to hydrogen and carbon dioxide gas and this gas is then applied to the fuel cell anode electrode by line 3. As above mentioned, the aforesaid applied hydrogen gas and the oxidant gas supplied on line 4 undergo electrochemical conversion in the cell to produce electrical current on lines 5 and 6 for load 7.

Excess fuel gas not utilized in the electrochemical reaction is fed over line 13 to a burner 14 which burns the excess fuel to develop heat. This heat is then applied to vaporizer 9 and reformer 8 to provide the heat energy for vaporization and reformation.

As can be appreciated, variations or changes in the load 7 require corresponding changes in flow rate of the fuel gas supplied to the fuel cell 2 from the line 3 in order to provide constant output power to the load. Changes in the flow rate of the fuel gas, in turn, are generally effected by changing the flow rate of the liquid fuel supplied on line 11 to the vaporizer 9. These changes are then reflected in the flow rate of fuel delivered by the vaporizer on line 12 to reformer 8 which, in turn, provides a corresponding change in the fuel gas delivered on line 3 to the cell 2.

In accordance with the principles of the present invention, the vaporizer 9 is constructed such that its output flow rate can change rapidly to follow rapid changes in the liquid fuel flow on line 11 associated with rapid changes in the load 7. More specifically, the vaporizer 9, as shown more clearly in FIGS. 2, 3 and 4, comprises an inner cylindrical wall 21 and an outer cylindrical wall 22 which together define an annular chamber 23. Disposed within the chamber 23 and along the chamber length are rings 24 whose outer surfaces 25 contact the inner and an outer chamber walls 21 and 22.

Figure 3:
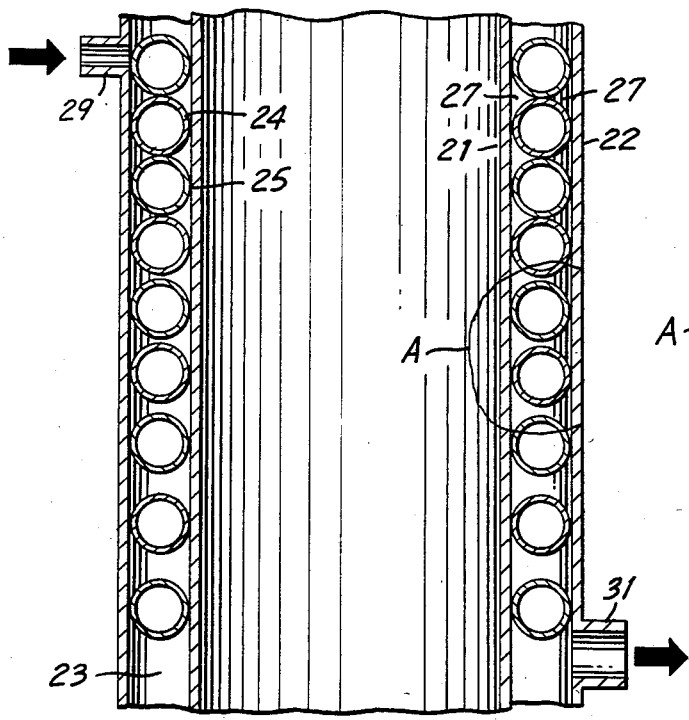
FIG. 3 illustrates a cross-sectional view of the vaporizer of FIG. 2.
Figure 4:
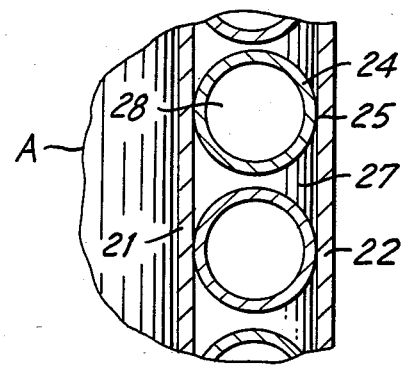
FIG. 4 shows an exploded view of the circled region A of the vaporizer cross-section of FIG. 3.

As shown in FIGS. 3 and 4, the rings 24 create a confined liquid/vapor flow space 27 closely adjacent the chamber walls for passage of liquid and/or vapor through the chamber. The space occupied by the rings, in turn, defines a liquid/vapor void space 28 since it cannot be occupied by liquid and/or vapor.

Figure 2:
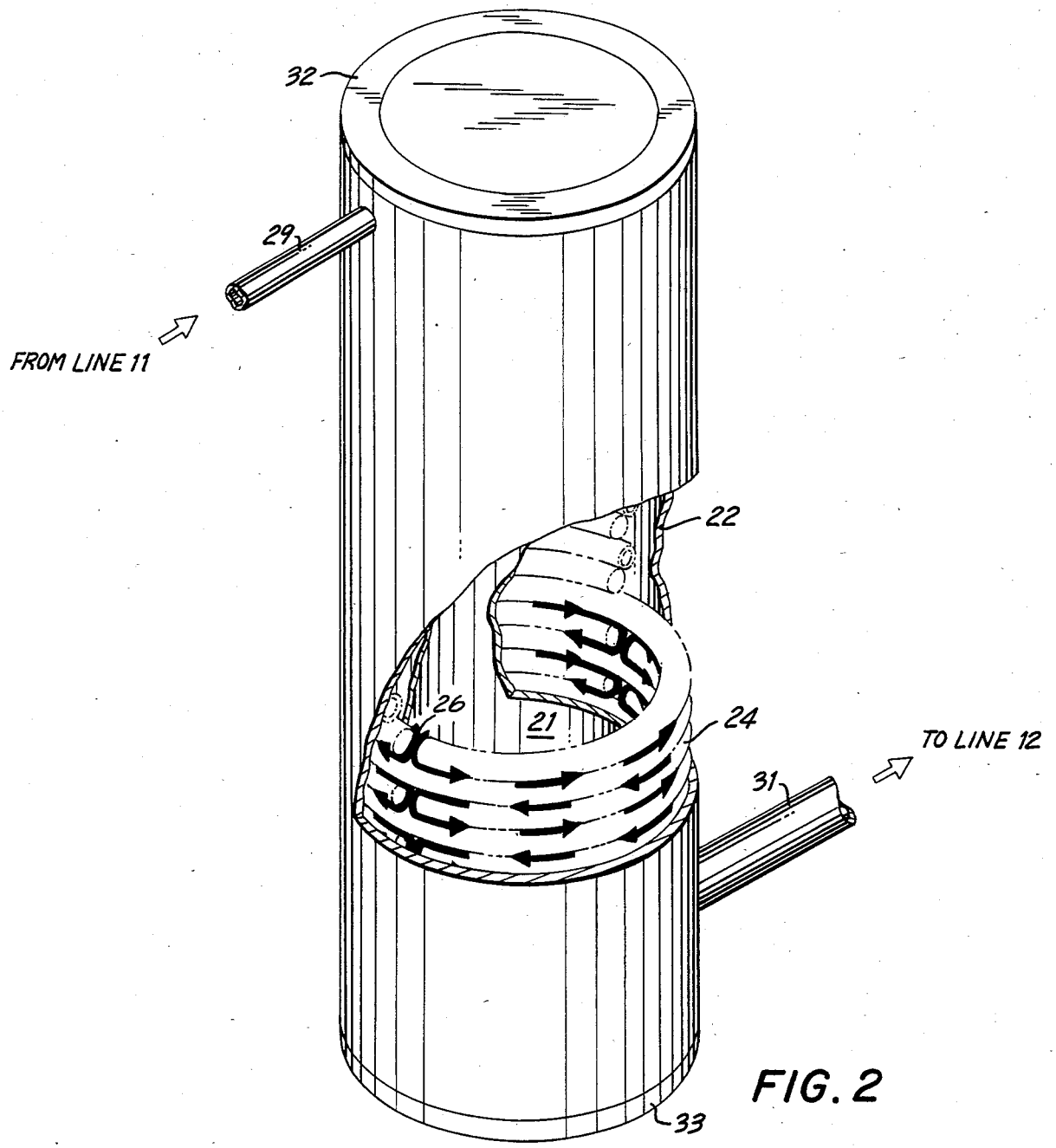
FIG. 2 shows an isometric partially broken away view of the fuel vaporizer of FIG. 1.

Each ring 24 extends substantially about the entire circumference of the annular chamber 23 and is cut or interrupted at a point along its length to define a through passage 26 (See, FIG. 2). Each passage 26 allows communication between the liquid/vapor flow space 27 immediately above and below its corresponding ring 24.

An inlet tube 29 receives liquid fuel from the line 11 and an outlet tube 31 delivers vaporized fuel gas to line 12. Annular covers 32 and 33 seal off the top and bottom of the annular chamber so as to confine the liquid and/or resultant vapor to the chamber.

As shown, the rings 24 are of circular configuration, but in actual practice they may be squeezed slightly so as to take on an eliptical configuration. Of course other configurations might also be employed. Likewise other than cylindrical configurations might also be employed for the inner and outer walls 21 and 22.

In practice, the fuel to be vaporized is applied from line 11 to the inlet tube 29. The fluid then splits into opposite circumferential flows along the first liquid/vapor flow space 27 and proceeds therethrough until the flows join again at the corresponding passageway 26. At this point, the combined flow passes through the passageway 26 to the next liquid/vapor flow space 27 where it again splits into two circumferential flows. These flows meet at the passageway 26 of this next liquid/vapor flow space and, in turn, proceed to yet the next liquid/vapor flow space 27 where the process is again repeated.

As the liquid is proceeding in this fashion, it is being continuously heated by the walls 21 and 22 which, in turn, are heated by hot gases generated by burner 14. The liquid is thus continuously vaporized so that both liquid and vapor traverse the liquid/vapor flow spaces 27 and connecting passages 26. Finally a point is reached along the chamber length at which all the liquid is vaporized and the resultant vapor continues through the spaces and passageways and exits from the outlet 31 as the desired gas vapor.

As can be appreciated, the presence of the rings 24 in the chamber 23 creates a limited liquid/vapor flow space or volume, while also creating an extended flow path which is closely adjacent the heated walls 21 and 22. As a result, the vaporizer 9 is able to respond substantially instantaneously to changes in the flow rate of fuel at the input 29. The output flow rate of vaporized fuel thus closely tracks the input flow rate of fuel so that there is no substantial loss in response.

More particularly, an increase in the flow of liquid fuel at the input 29 of the vaporizer 9 is found to result in total vaporization of the fuel at a point further along the length of the vaporizer path, rather than causing a build-up or accumulation of fluid in the path. No substantial inventory of fluid is thus created and the output vapor flow rate is thus able to closely and rapidly follow the changes in input flow rate.

In order to ensure that the liquid introduced into the vaporizer 9 traverses a maximum flow path it is preferable that the rings 24 be arranged so that the passageway 26 in each succeeding ring is displaced circumferentially by approximately 180 degrees relative to the passageway 26 of the preceding ring. With this type of configuration, the opposite circumferential flows will each encompass substantially one-half the circumferential length of each liquid/vapor flow space, thus maximizing the length of path traveled.

It should be noted that, as in the case of most liquids, the hydrocarbon liquids applied to vaporizer 9 undergo a substantial increase in volume (e.g., an increase of 1,000 or greater) upon conversion from liquid to vapor. In order for the vaporizer 9 to accommodate this increase in volume in a manner which maintains a free flow of fluid and inhibits pressure drop, the rings 24 may be selectively spaced by increasing amounts when proceeding along the vaporizer length from inlet to outlet as can be seen in FIG. 3.

The rings 24 of the vaporizer 9 can be simply constructed from lengths of metal tubing which are bent and cut to provide the split ring configuration. If the tubing is hollow, the ends of the tubing will have to be sealed to prevent it from filling with fluid.

Figure 5:
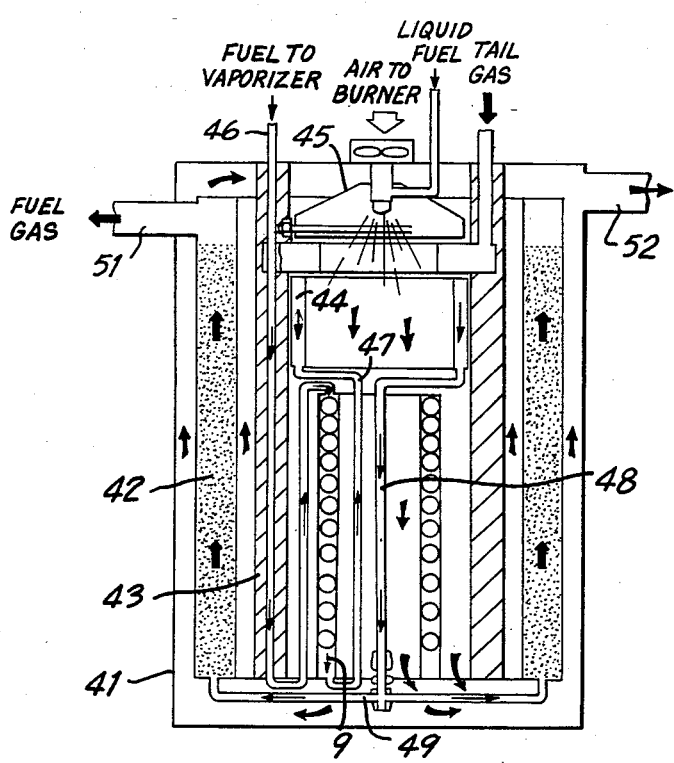
FIG. 5 illustrates a cross-sectiontal view of the vaporizer of the invention incorporated into a fuel, reformer.
Figure 6:
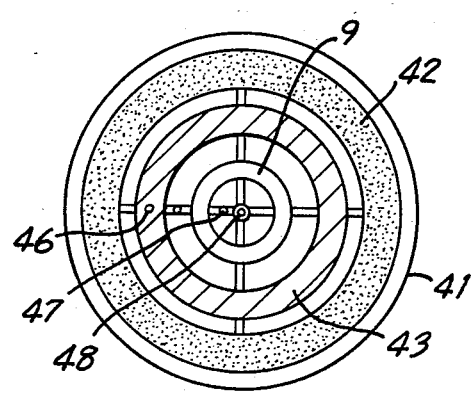
FIG. 6 illustrates a top view of the reformer of FIG. 1.

In FIGS. 5 and 6 the vaporizer of FIGS. 2–4 has been incorporated into a conventional cylindrical fuel reformer used in conjunction with a conventional burner. More particularly, the reformer 8 comprises an enclosed container 41 into which is concentrically mounted an annular catalyst chamber 42 and an annular support cylinder 43. Concentrically disposed within the support cylinder 43 is a vaporizer 9 configured in accordance with the invention.

Mounted above the vaporizer 9 is a superheater element 44 and a burner 45. Fuel for the vaporizer 9 is carried by fuel line 46 which is supported in the wall of cylinder 43. Vapor output of the vaporizer is carried by the line 47 to the superheater 44 and carried from the superheater output via lines 48 and 49 to the input to the annular catalyst chamber 42. The resultant reactant gas is coupled via port 51 out of the catalyst chamber.

In operation, fuel to be vaporized is applied to fuel line 46 and carried by the line to the annular chamber of vaporizer 9. Heated air developed by the burner 45 passes down along the exterior of the inner and outer cylinder walls of the vaporizer 9 heating same and, therefore, the liquid fuel passing therethrough.

The liquid fuel is thereby vaporized and the vaporized fuel is passed from the vaporizer, via line 47, to the superheater 44. After further heating, the vaporized fuel is carried from the superheater via lines 48 and 49 through the catalyst bed 42. The bed 42 is also heated by the burner air which passes upwardly adjacent the catalyst bed walls after passing downwardly along the vaporizer walls. The vaporized fuel is converted by the catalyst bed into fuel gas and conveyed to port 51 for passage out of the reformer. The burner air exits the container 41 through a flue exhaust 52.

A fuel vaporizer as shown in FIG. 2 was constructed in the manner shown in FIGS. 3 and 4. The vaporizer cylindrical walls 21 and 22 were 8 inches high and fabricated from steel tubing having a wall thickness of 1/16 inch. The diameters of the inner and outer cylindrical walls was $2\frac{3}{4}$ and $3\frac{3}{4}$ inches, respectively. The rings 24 were fabricated from $\frac{1}{8}$ inch tubing.

The vaporizer was tested as an integral part of a methanol steam reformer having a configuration as shown in FIG. 5 and operating on fuel comprising 58% methanol and 42% water by weight. The reforming catalyst comprised copper-zinc oxide and was contained in an annular chamber surrounding the vaporizer. The reformer output was then applied to a fuel cell.

With this configuration, the vaporizer was found to satisfactorily follow step variations in output load. In particular, a stepwise load increase from a fuel consumption rate of 35 ml/min at hot idle operation to a rate of 70 ml/min at rated power operation was realized without interruption or diminishing of the power output to the electrical load.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A vaporizer for converting liquid fuel to fuel vapor comprising:
   a first wall surrounded by a second wall defining therebetween an annular chamber;
   a plurality of rings situated in the chamber after the other along the chamber length, each ring extending over the circumference of the chamber in contact with said first and second walls, whereby said rings and walls define flow spaces for passage of fluid through said vaporizer, each ring having a passageway for enabling communication of the flow spaces on opposite sides of the ring.

2. A vaporizer in accordance with claim 1 wherein:
   the passageway of each ring is displaced circumferentially by 180 degrees relative to the passageways of the immediately adjacent rings.

3. A vaporizer in accordance with claim 2 wherein:
   the annular chamber has an inlet for receiving liquid fuel and an outlet for conveying exiting vaporized fuel;
   and the spacing between the rings along the length of the chamber is greater for rings closer to the outlet relative to rings closer to the inlet.

4. A vaporizer in accordance with claim 3 wherein:
   said first and second walls are of cylindrical configuration.

5. Apparatus comprising, in combination;
   a vaporizer for converting liquid fuel to fuel vapor including: a first wall surrounded by a second wall defining therebetween an annular chamber; a plurality of rings situated in the chamber one after the other along the chamber length, each ring extending over the circumference of the chamber in contact with said first and second walls, whereby said rings and walls define flow spaces for passage of fluid through said vaporizer, each ring having a passageway for enabling communication of the flow spaces on opposite sides of the ring; an inlet for delivering liquid fuel to said annular chamber; and an outlet for extracting fuel vapor from said chamber;
   a fuel reformer including a catalyst receiving said extracted fuel vapor and converting said fuel vapor to fuel gas.

6. Apparatus in accordance with claim 5 further including a fuel cell having an anode section for receiving said fuel gas.

7. Apparatus in accordance with claim 6 further including:
   a burner for generating heat for said vaporizer and fuel reformer.

8. Apparatus in accordance with claim 7 wherein:
   said burner receives fuel vapor exhausted from said fuel cell.

9. Apparatus in accordance with claim 6 wherein:
   said fuel reformer is a steam reformer and includes a catalyst for converting hydrocarbon fuel vapor to hydrogen gas.

10. Apparatus in accordance with claim 9 wherein:
    said steam reformer comprises an annular chamber in surrounding relationship to said first and second walls of said vaporizer containing said catalyst.

11. Apparatus in accordance with claim 10 further comprising:
    means for heating said annular chambers of said vaporizer and said steam reformer.

* * * * *

UNITED STATES PATENT AND TRADEMARK OFFICE
CERTIFICATE OF CORRECTION

PATENT NO. : 4,588,659
DATED : May 13, 1986
INVENTOR(S) : Sandors G. Abens and William Keil It is certified that error appears in the above—identified patent and that said Letters Patent is hereby corrected as shown below:

Column 1, Before "BACKGROUND OF THE INVENTION" add the following:

GOVERNMENT INTERESTS

The invention described herein may be manufactured, used and licensed by or for the United States Government for governmental purposes without the payment of any royalties thereon. The invention herein evolved out of Government Contract Number DAAK 70-79-C-0249 by and between the U.S. Army and Energy Research Corporation.

Signed and Sealed this

Third Day of March, 1987

*Attest:*

*Attesting Officer*

DONALD J. QUIGG

*Commissioner of Patents and Trademarks*